United States Patent
Sheng et al.

(10) Patent No.: US 10,141,100 B2
(45) Date of Patent: Nov. 27, 2018

(54) COMMON-MODE NOISE REDUCTION

(71) Applicant: GOOGLE INC., Mountain View, CA (US)

(72) Inventors: Honggang Sheng, Milpitas, CA (US); Yiming Li, Gainesville, FL (US); Shuo Wang, Gainesville, FL (US); Srikanth Lakshmikanthan, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/666,776

(22) Filed: Aug. 2, 2017

(65) Prior Publication Data
US 2018/0277300 A1    Sep. 27, 2018

Related U.S. Application Data

(60) Provisional application No. 62/476,650, filed on Mar. 24, 2017.

(51) Int. Cl.
*H01F 27/36*   (2006.01)
*H01F 27/28*   (2006.01)
(Continued)

(52) U.S. Cl.
CPC ............ *H01F 27/36* (2013.01); *G06F 1/26* (2013.01); *H01F 27/24* (2013.01);
(Continued)

(58) Field of Classification Search
CPC ...... H01F 27/36; H01F 27/24; H01F 27/2823; H01F 27/29; H01F 27/323; H01F 27/40; H02M 3/335; G06F 1/26
See application file for complete search history.

(56) References Cited

U.S. PATENT DOCUMENTS 6,089,453 A    7/2000   Kayser et al.
6,633,168 B2 *  10/2003  Hopkinson .......... G01R 15/183
                                                           324/455
(Continued)

FOREIGN PATENT DOCUMENTS

GB    2461509 A      1/2010
WO    2011124761 A2  10/2011

OTHER PUBLICATIONS

International Search Report and Written Opinion for International Application PCT/US2017/061070, dated Jan. 15, 2018, 14 pages.
(Continued)

*Primary Examiner* — Emily P Pham
(74) *Attorney, Agent, or Firm* — Brake Hughes Bellermann LLP

(57) ABSTRACT

In one general aspect, a converter circuit includes a magnetic core and a coil assembly. The coil assembly includes a primary winding assembly, a secondary winding assembly, and an auxiliary winding assembly. The primary winding assembly includes a conductive medium arranged in at least one primary winding layer. The secondary winding assembly includes a conductive medium arranged in at least one secondary winding layer. The auxiliary winding assembly includes a conductive medium arranged in at least one auxiliary winding layer. The at least one auxiliary winding layer includes an auxiliary winding layer disposed adjacent to a layer of the at least one primary winding layer and adjacent to a layer of the at least one secondary winding layer.

18 Claims, 8 Drawing Sheets

(51) Int. Cl.
| | |
|---|---|
| *H01F 27/32* | (2006.01) |
| *H01F 27/29* | (2006.01) |
| *H01F 27/40* | (2006.01) |
| *H02M 3/335* | (2006.01) |
| *G06F 1/26* | (2006.01) |
| *H01F 27/24* | (2006.01) |

(52) U.S. Cl.
CPC ......... *H01F 27/2823* (2013.01); *H01F 27/29* (2013.01); *H01F 27/323* (2013.01); *H01F 27/40* (2013.01); *H02M 3/335* (2013.01)

(56) References Cited

U.S. PATENT DOCUMENTS

| | | | | |
|---|---|---|---|---|
| 6,972,656 | B2* | 12/2005 | Takeshima | H02M 3/3376 336/180 |
| 7,245,087 | B2* | 7/2007 | Nishikawa | H02M 3/3353 315/224 |
| 7,564,334 | B2* | 7/2009 | Odell | H01F 27/34 336/180 |
| 7,868,724 | B2* | 1/2011 | Sicong | H01F 27/362 336/84 R |
| 8,044,754 | B2* | 10/2011 | Ouyang, Jr. | H01F 27/2885 336/182 |
| 2004/0246749 | A1 | 12/2004 | Odell et al. | |
| 2005/0002206 | A1* | 1/2005 | Park | H01F 27/367 363/16 |
| 2007/0152794 | A1 | 7/2007 | Chen et al. | |
| 2010/0165671 | A1 | 7/2010 | Coulson et al. | |
| 2013/0235619 | A1* | 9/2013 | Zhou | H01F 27/2885 363/21.04 |
| 2013/0242452 | A1 | 9/2013 | Park et al. | |
| 2014/0185337 | A1 | 7/2014 | Espino et al. | |
| 2017/0163145 | A1* | 6/2017 | Cheng | H02M 1/12 |

OTHER PUBLICATIONS

Chen et al., "An Evaluation Method of Transformer Behaviors on Common-mode Conduction Noise in SMPS", Ninth International Conference on Power Electronics and Drive Systems, Dec. 5-8, 2011, pp. 782-786.
Choi et al., "Designing Common-Mode (CM) EMI Noise Cancellation Without Y-Capacitor", Twenty Second Annual IEEE Applied Power Electronics Conference, 2007, pp. 936-940.
Chu et al., "A Generalized Common-Mode Current Cancellation Approach for Power Converters", IEEE Transactions on Industrial Electronics, vol, 62. No. 7, Jul. 2015, pp. 4130-4140.
Cochrane et al., "Passive Cancellation of Common-Mode Noise in Power Electronic Circuits", IEEE Transactions on Power Electronics, vol. 18, Issue 3, May 2003, pp. 756-763.
Fu et al., "Novel Techniques to Suppress the Common-Mode EMI Noise Caused by Transformer Parasitic Capacitances in DC-DC Converters", IEEE Transactions on Industrial Electronics, vol. 60, No. 11, Nov. 2013, pp. 4968-4977.
Kang et al., "EMI Reduction Technique of Flyback Converter Based on Capacitance Model of Transformer with Wire Shield", 9th International Conference on Power Electronics, Jun. 1-5, 2015, pp. 163-169.
Kong et al., "Common Mode EMI Noise Suppression in Bridgeless Boost PFC Converter", Twenty Second Annual IEEE Applied Power Electronics Conference, 2007, pp. 929-935.
Kong et al., "Reducing Common Mode EMI Noise in Two-Switch Forward Converter", IEEE Transactions on Power Electronics, May 2011, vol. 26. No. 5, pp. 1522-1533. This paper was presented at the IEEE Energy Conversion Congress and Exposition, San Jose, CA, Sep. 20-24, 2009.
Kong et al., "Transformer Structure and its Effects on Common Mode EMI Noise in Isolated Power Converters", Twenty-Fifth Annual IEEE Applied Power Electronics Conference and Exposition, 2010, pp. 1424-1429.
Meng et al., "Characterizing Noise Source and Coupling Path in Flyback Converter for Common-mode Noise Prediction", Twenty-Sixth Annual IEEE Applied Power Electronics Conference and Exposition, 2011, pp. 1704-1709.
Prieto et al., "Optimizing the Winding Strategy of the Transformer in a Flyback Converter", 27th Annual IEEE Power Electronics Specialists Conference, 1996, pp. 1456-1462.
Wang et al., "Common Mode Noise Reduction for Boost Converters Using General Balance Technique", IEEE Transactions on Power Electronics, vol. 22, Issue 4, Jul. 2007, pp. 1410-1416.
Wang et al., "Developing Parasitic Cancellation Technologies to Improve EMI Filter Performance for Switching Mode Power Supplies", IEEE Transactions on Electromagnetic Compatibility, vol. 47, No. 4, Nov. 2005, pp. 921-929.
Xie et al., "Equivalent Noise Source: An Effective Method for Analyzing Common-Mode Noise in Isolated Power Converters", IEEE Transactions on Industrial Electronics, vol. 63, No. 5, May 2016, pp. 2913-2924.
Xie et al., "Shielding-Cancelation Technique for Suppressing Common-Mode EMI in Isolated Power Converters", IEEE Transactions on Industrial Electronics, vol. 62, No. 5, May 2015, pp. 2814-2822.
Xu et al., "Investigating a Guard Trace Ring to Suppress the Crosstalk due to a Clock Trace on a Power Electronics DSP Control Board", IEEE Transactions on Electromagnetic Compatibility, vol. 57, No. 3, Jun. 2015, pp. 546-554.
Zhang et al., "Two-capacitor Transformer Winding Capacitance Models for Common-Mode EMI Noise Analysis in Isolated DC-DC Converters", Energy Conversion Congress and Exposition, 2016, 8 pages.

* cited by examiner

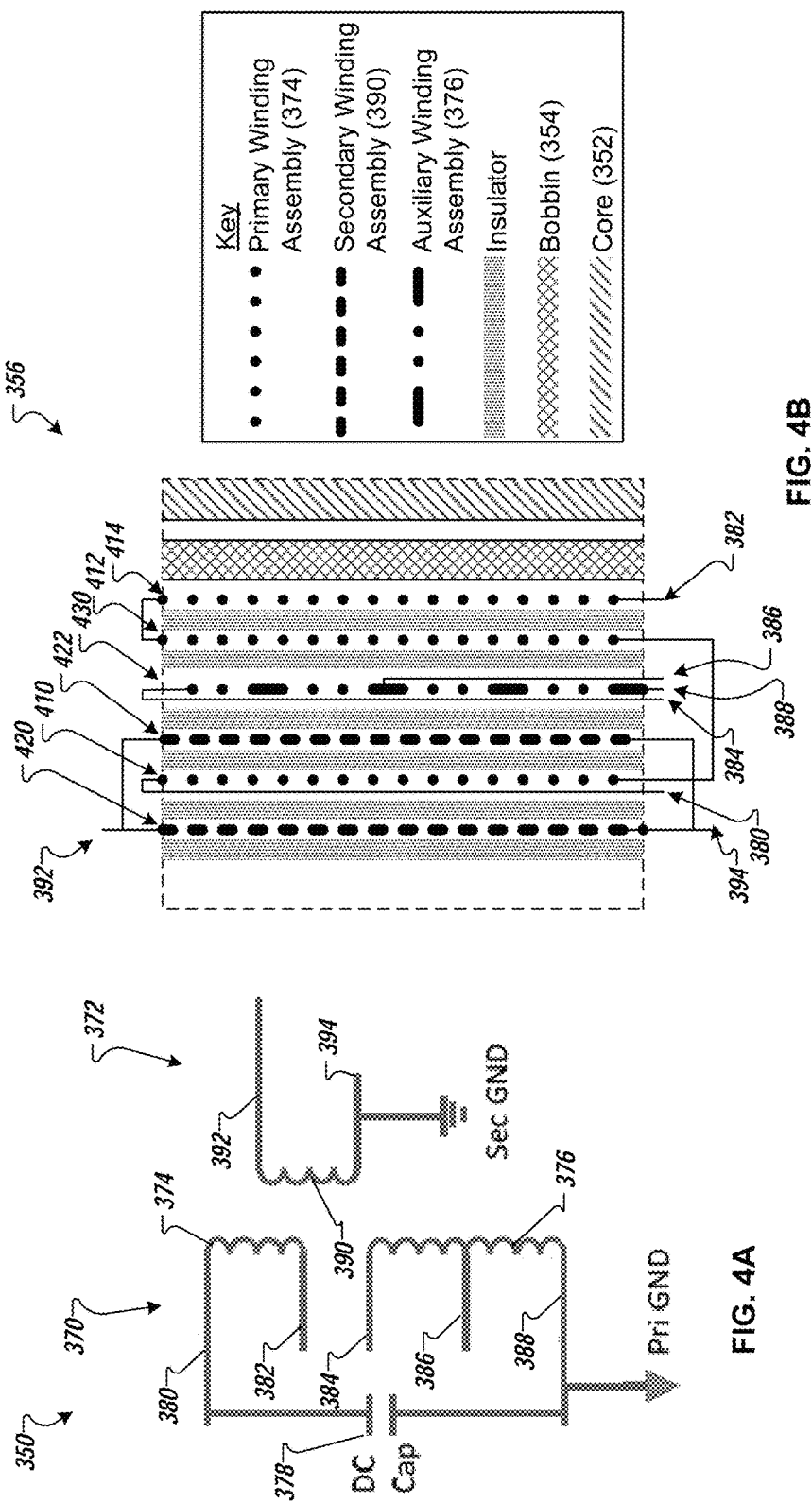

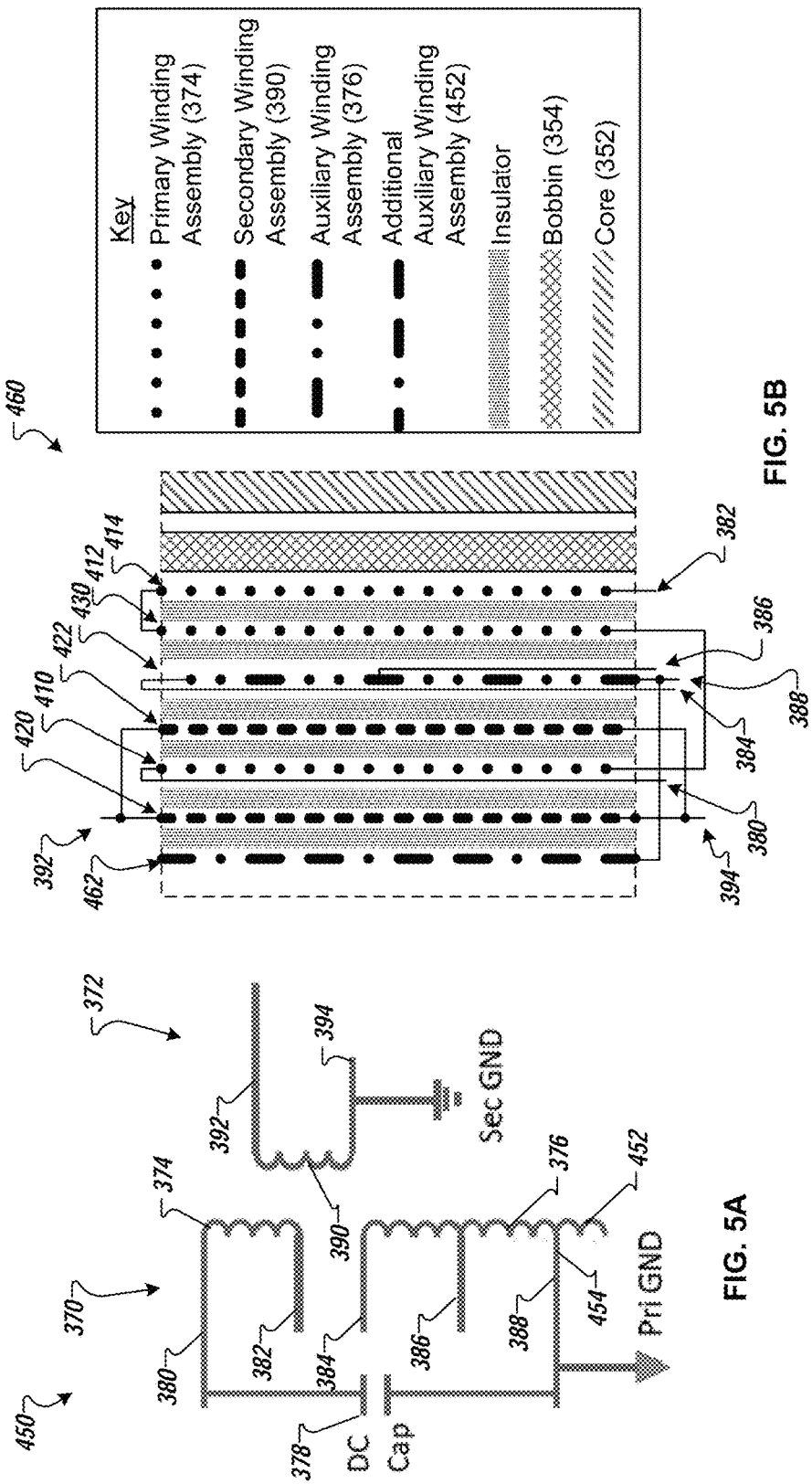

COMMON-MODE NOISE REDUCTION

CROSS-REFERENCE TO RELATED APPLICATIONS

This application claims priority to U.S. Provisional Application No. 62/476,650, titled COMMON-MODE NOISE REDUCTION and filed on Mar. 24, 2017, the entire contents of which are hereby incorporated herein by reference.

TECHNICAL FIELD

This description generally relates to reduction of common mode noise in electrical circuits. The description, in particular, describes common-mode noise reduction in converters and transformers.

BACKGROUND

Power adapters are used to provide power to electronic devices such as laptops, smart phones, and tablets from a power source such as a power grid. The power adapter may convert the power provided by the power source to a form required by the electronic devices. For example, a power adapter may convert 120 V alternating current (AC) power to 5 V direct current (DC) power.

Power adapters may include a transformer to electrically isolate the power source from the transform the voltage. Transformers are electrical devices that transform electrical energy in one circuit to electrical energy in a second circuit through electromagnetic induction. Power adapters may also include a rectifier such as a diode bridge to convert an AC current to a DC current.

SUMMARY

In one general aspect, a converter circuit includes a magnetic core and a coil assembly. The coil assembly includes a primary winding assembly, a secondary winding assembly, and an auxiliary winding assembly. The primary winding assembly includes a conductive medium arranged in at least one primary winding layer. The secondary winding assembly includes a conductive medium arranged in at least one secondary winding layer. The auxiliary winding assembly includes a conductive medium arranged in at least one auxiliary winding layer. The at least one auxiliary winding layer including an auxiliary winding layer disposed adjacent to a layer of the at least one primary winding layer and adjacent to a layer of the at least one secondary winding layer.

In another general aspect, a power adapter includes a rectifier circuit and a converter circuit. The converter circuit includes a magnetic core and a coil assembly. The coil assembly includes a primary winding assembly, a secondary winding assembly, and an auxiliary winding assembly. The primary winding assembly includes a conductive medium arranged in multiple primary winding layers, including a first primary winding layer, a second primary winding layer, and a third primary winding layer. The secondary winding assembly includes a conductive medium arranged in multiple secondary winding layers, including a first secondary winding layer and a second secondary winding layer. The auxiliary winding assembly includes a conductive medium arranged in at least one auxiliary winding layer, including an auxiliary winding layer being disposed adjacent to one of the primary winding layers and adjacent to one of the secondary winding layers.

In yet another general aspect, a system comprises a computing device and a power adapter. The portable computing device includes a processing device, a memory device, and a display device. The power adapter includes a rectifier circuit and a converter circuit. The converter circuit including a magnetic core and a coil assembly. The coil assembly includes a primary winding assembly, a secondary winding assembly, an auxiliary winding assembly, an additional auxiliary winding assembly. The primary winding assembly including a conductive medium arranged in a multiple primary winding layers, including a first primary winding layer, a second primary winding layer, and a third primary winding layer. The secondary winding assembly including a conductive medium arranged in a multiple secondary winding layers, including a first secondary winding layer and a second secondary winding layer. The auxiliary winding assembly including a conductive medium arranged in at least one auxiliary winding layer. The at least one auxiliary winding layer comprising an auxiliary winding layer disposed adjacent to a layer of the primary winding layers and adjacent to a layer of the secondary winding layers. The additional auxiliary winding assembly including a conductive medium arranged in at least one additional auxiliary winding layer. The at least one additional auxiliary winding layer being disposed at the outside of the coil assembly.

The details of one or more implementations are set forth in the accompanying drawings and the description below. Other features will be apparent from the description and drawings, and from the claims.

BRIEF DESCRIPTION OF THE DRAWINGS

FIG. 4A shows a schematic circuit diagram of the coils of an example of the flyback converter assembly of FIG. 3A.

FIG. 4B shows a schematic diagram in cross-section of a portion of the example flyback converter assembly of FIG. 3A.

FIG. 5A shows a schematic circuit diagram of the coils of an example of the flyback converter assembly of FIG. 3A.

FIG. 5B shows a schematic diagram in cross-section of a portion of the example flyback converter assembly of FIG. 3A.

Like reference symbols in the various drawings indicate like elements.

DETAILED DESCRIPTION

Figure 1:
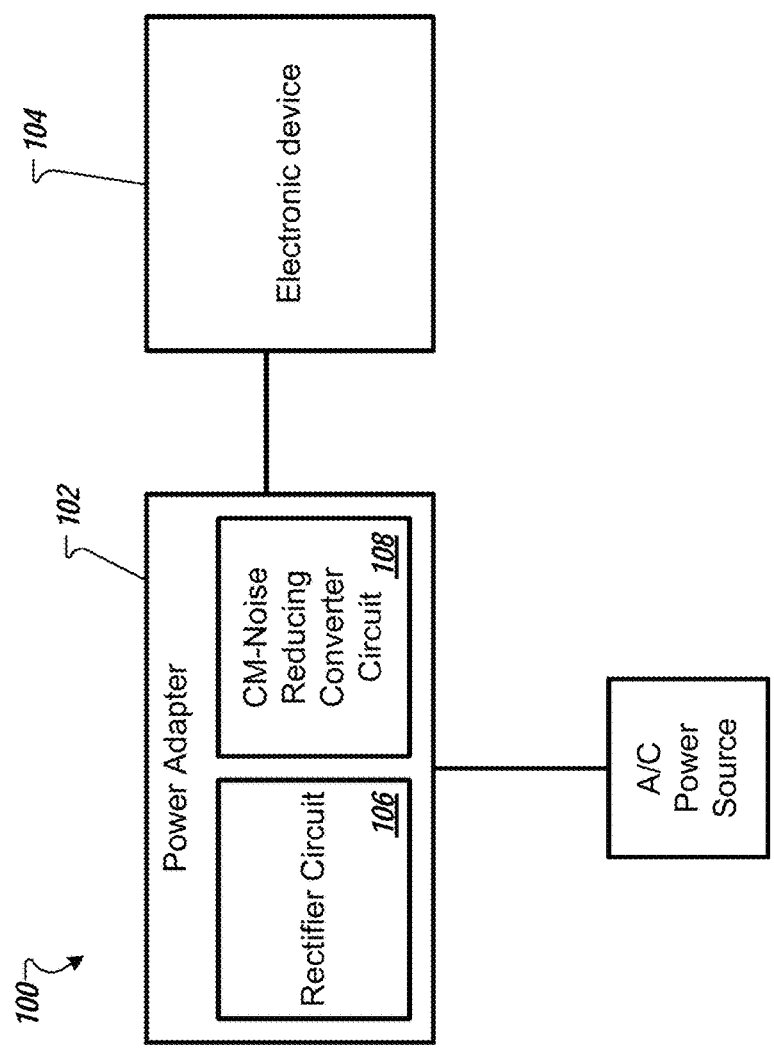
FIG. 1 is a schematic diagram of an example system for reducing common-mode noise.

Power adapters for electronic devices adapt a first form of electrical power (e.g., mains power provided at a wall outlet)

to a second form of electrical power that can be used safely by the electronic device. That power can then be used for one or both of operating the electronic device and charging a battery in the electronic device.

Power adapters typically include at least a rectifier circuit and a converter circuit (e.g., a flyback converter circuit). The rectifier circuit converts an alternating current (AC) power, which periodically reverses its direction of current flow, to a direct current (DC) power, which flows in the only one direction. The converter circuit converts one or more of the voltage and or current of the input power. For example, the converter may increase or decrease the voltage level of the input power to a target output voltage level.

Converter circuits may generate common mode-noise (CM-noise) in the output power. If not mitigated, this CM-noise may cause the power adapter or a device connected thereto generate electromagnetic interference (EMI) at unacceptably high levels that interfere with other electronic devices and/or fail to comply with regulations or industry standards related to electromagnetic interferences (EMI). Additionally, the CM-noise can interfere with the operation of the connected electronic device. The CM-noise may be mitigated, at least in part, with an EMI filter.

Embodiments described herein include a CM-noise reducing converter circuit. The CM-noise reducing converter circuit is configured to convert the input voltage while reducing the amount of CM-noise generated. In some embodiments, the CM-noise reducing converter circuit reduces CM-noise to a power adapter and does not need to include an EMI filter with a CM-noise choke to comply with applicable regulations and industry standards. By removing the EMI filter or reducing the size of the EMI filter by eliminating the CM-noise choke, the power adapter can be made smaller, lighter, and more compact.

Embodiments of the CM-noise reducing converter circuit include a magnetic core, a coil assembly, and a multiple leads connected to the coil assembly. The magnetic core is a structure formed from a magnetic material such as ferrite that is used to modify an inductively generated magnetic field in the converter. In some embodiments, the core has an "EE" shape. Although alternatives are possible, the coil is typically wound around a bobbin that is disposed around a portion of the core (e.g., around a center pole of the EE core).

The coil assembly includes windings of at least two conductors arranged in winding assemblies, a primary winding assembly and a second winding assembly. The primary winding assembly includes a first primary terminal connection and a second primary terminal connection, and the secondary winding assembly includes a first secondary terminal connection and a second terminal connection. The primary winding assembly is directly or indirectly electrically connected to the power source (i.e., the primary winding assembly is driven by the input power source) via the primary terminal connections, and the secondary winding assembly is directly or indirectly electrically connected to the load electronic device (i.e., the load device receives electric power from the secondary winding assembly) via the secondary terminal connections.

The conductors are elongate strands of electrically conductive material. Examples of the conductors include wires of various gauges. Although alternatives are possible, at least some of the conductors include insulated wires.

A voltage applied to the primary winding assembly via the terminals of the primary winding assembly is stepped-up or stepped-down in the secondary winding assembly in proportion to the ratio of the number of turns (i.e., the number of times the primary conductor is wound around the core) in the primary winding assembly to the number of turns in the secondary winding assembly. Each of the primary winding assembly and the secondary winding assembly may include one or more layers of windings.

Additionally, some embodiments of the coil include one or more auxiliary winding assemblies, comprising one or more layers of windings of an auxiliary conductor. Each of the auxiliary winding assemblies includes a first auxiliary terminal connection and a second auxiliary terminal connection. Some embodiments of auxiliary winding assemblies also include a third auxiliary terminal connection too. An auxiliary winding assembly can, for example, provide power to a component of the power adapter such as a control chip. Additionally, some embodiments include an auxiliary winding assembly that is open or floating (e.g., a terminal connection is not connected to anything).

In some embodiments, layers of the primary winding assembly, the secondary winding assembly, and the auxiliary winding assembly are interleaved. For example, the layers can be interleaved to reduce or minimize leakage inductance.

In at least some embodiments, the layers are arranged in the following order (starting from the outside of the coil): a first secondary layer (Sec1) of the secondary winding assembly, a first primary layer (Pri1) of the primary winding assembly, a second secondary layer (Sec2) of the secondary winding assembly, an auxiliary layer (Aux) of the auxiliary winding assembly, a second primary layer (Pri2) of the primary winding assembly, and a third primary layer (Pri3) of the primary winding assembly (i.e., Sec1, Pri1, Sec2, Aux, Pri2, Pri3). Some embodiments also include an additional auxiliary winding assembly that includes an additional auxiliary layer (AdAux) disposed outside of the first secondary layer (Sec1) of the secondary winding assembly (i.e., AdAux, Sec1, Pri1, Sec2, Aux, Pri2, Pri3). This arrangement of layers of the winding assemblies reduces CM-noise as compared to many other winding arrangements by, for example, arranging the layers so that the voltage differences between layers of the primary winding assembly and adjacent layers of the secondary winding assembly are reduced or minimized.

In some embodiments, the terminal connections of the primary winding assembly, secondary winding assembly, and one or more auxiliary winding assemblies are also arranged to reduce CM-noise. For example, the placement of the terminal connections can further reduce the voltage differences between layers of the primary winding assembly and adjacent layers of the secondary winding assembly.

For illustrative purposes, the following example describes the arrangement of the terminal connectors with respect to a top of the winding assemblies and a bottom of the winding assemblies. It should be understood, however, that in some embodiments the orientation is swapped (i.e., the terminal connections described as being disposed at the top are disposed at the bottom and vice-versa).

In at least some embodiments, the primary layers are connected in series. Although alternatives are possible, the first primary terminal connection is attached to a top end of the first primary winding layer, the bottom end of the first primary winding layer is connected to the bottom end of the second primary winding layer, the top end of the second primary winding layer is connected to the top end of the third primary winding layer, and the bottom end of the third primary winding layer is connected to the second primary terminal connection. The secondary layers are connected in parallel, having a first secondary terminal connected to the bottoms of both the first and second secondary layers and the second secondary terminal connected to the tops of both the first and second secondary layers. Additionally, the first auxiliary terminal is connected to the top of the auxiliary layer, the second auxiliary terminal is connected to the auxiliary layer at a position between the top and the bottom of the auxiliary layer (e.g., at the middle of the auxiliary layer, within the middle 10% of the auxiliary layer, within the middle 20% auxiliary layer, within the middle 50% of the auxiliary layer), and a third auxiliary terminal is connected to the bottom of the auxiliary layer. Beneficially, this arrangement of terminal connections further reduces the voltage differences between adjacent layers of the primary and secondary winding assemblies so as to reduce CM-noise.

In at least some embodiments that include the additional auxiliary winding assembly, the top of the additional auxiliary winding layer is connected to the second auxiliary terminal connector and the bottom of the additional auxiliary winding layer is floating (i.e., not connected). It should be noted that the voltage difference between AdAux and Sec1 is negative, so there is displacement CM current flowing from Sec1 to AdAux winding and then back to primary side. This helps to cancel the displacement CM current flowing from Pri1 to Sec1 and Sec2 as well as from Aux to Sec2 due to the positive voltage difference between Pri1 and Sec1, between Pri1 and Sec2, and between Aux and Sec2 layers (because Aux and Pri1 have more number of turns on each layer than Sec1 and Sec2 layers). Because AdAux is on the outside of the windings, it is easy to make adjustment. Because of the reasons above, this technique is more efficient than the conventional shielding layer method. The position of the AdAux winding can also be adjusted to make an efficient cancellation. When the AdAux winding starts from the top of the coil, the voltage difference between AdAux and Sec1 layers is the highest which means fewer number of turns can have the same cancellation effect as more number turns when AdAux winding is located on the bottom.

In some embodiments, the CM-noise reducing circuit also includes a shielding structure disposed around the core. For example, some embodiments of the shielding structure include a shielding layer formed from a conductive foil such as copper foil. In some embodiments, the shielding structure is connected to a primary ground (e.g., through the second auxiliary terminal connector).

Additionally, some embodiments of a CM-noise reducing circuit include a balance capacitor connected between the primary winding assembly and the secondary winding assembly. In some embodiments, the balance capacitor is connected between the first primary terminal connector and the first secondary terminal connector. Alternatively, the balance capacitor is connected between the second primary terminal connector and the second secondary terminal connector. Techniques described herein can be used to determine the position and capacitance of the balance capacitor.

FIG. 1 is a schematic diagram of an example system 100 for reducing common-mode noise. In this example, the system 100 includes a power adapter 102 and an electronic device 104. The power adapter 102 includes a rectifier circuit 106 and a common-mode noise reducing converter circuit 108. Also shown in FIG. 1 is an AC power source.

The power adapter 102 is connected to the AC power source and converts the power received therefrom for use by the electronic device 104. In some embodiments, the power adapter 102 converts the power from AC to DC and steps down the voltage, for example, from 120 volts or 240 volts to between 5 volts and 20 volts. The power adapter 102 can provide for operating the electronic device 104 and/or charging a battery of the electronic device 104.

The electronic device 104 can be any type of electronic device. An example of an electronic device is a computing device. Computing devices can include, but are not limited to, laptop computers, notebook computers, tablets, netbooks, smartphones, personal digital assistants, desktop computers, mobile phones, game consoles, and mobile computing devices. Other non-limiting examples of electronic devices include televisions, radios or other types of audio playback systems, appliances, and other types of electronic devices.

In some embodiments, the power adapter 102 is separate from the electronic device 104 and is connected to the electronic device via a cable. The cable can be configured to removably attach to a port on the electronic device 104. The cable can also be fixed to the electronic device 104. Similarly, the cable is configured to removably attach to a port on the power adapter 102 in some embodiments, while in other embodiments the cable is fixed to the power adapter. Alternatively, the power adapter 102 is incorporated in the electronic device 104.

The AC power source can be, for example, mains power. The power adapter 102 may be connected to the AC power source via a cable with a plug that is configured to fit an outlet that is connected to the AC power source.

The rectifier circuit 106 rectifies the power signal received from the AC source to convert the alternating current to a direct current. In some embodiments, the rectifier circuit 106 includes a diode bridge.

The CM-noise reducing converter circuit 108 is a circuit that converts the voltage of the power received from the rectifier circuit 106 to a different voltage level. The CM-noise reducing converter circuit 108 incorporates one or more of the techniques described herein to reduce CM-noise such as optimizing the arrangement of windings, including a shielding structure, and/or including a balance capacitor.

The power adapter 102 can include other components as well. For example, some embodiments include an electromagnetic interference (EMI) filter. The EMI filter can be used to reduce CM-noise. However, some embodiments of the CM-noise reducing converter circuit 108 described herein reduce CM-noise sufficiently such that an EMI filter is not needed.

Figure 2:
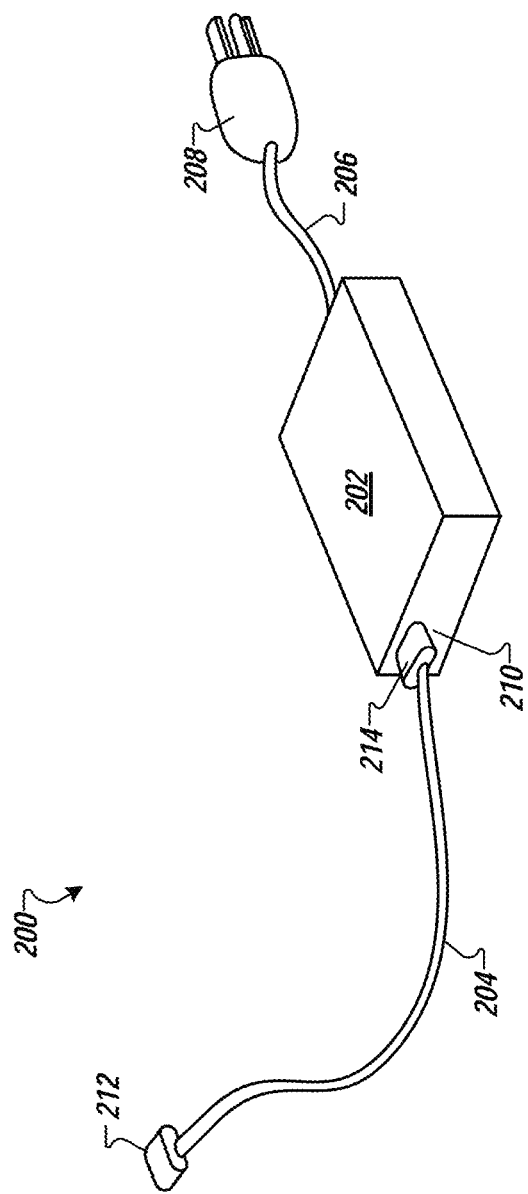
FIG. 2 is a schematic diagram illustrating an example system for implementing an example power adapter (power supply) that can include an embodiment of the CM-noise reducing converter circuit of FIG. 1.

FIG. 2 is a schematic diagram illustrating an example system 200 for implementing an example power adapter 202 (power supply) that includes a CM-noise reducing converter circuit. The power adapter 202 is an example of the power adapter 102.

Referring to FIG. 1, in some implementations, the electronic device 104 can use the power adapter 202 to convert an alternating current (AC) power signal to a direct current (DC) power signal for use by the electronic device 104. For example, the power adapter 202 can include one or more ports (e.g., port 210).

The system 200 can include a first cable 204 that can supply power from the power adapter 202 to an electronic device. The first cable 204 can include a first connector 212 and a second connector 214. In the example shown in FIG. 2, the second connector 214 can connect to (interface with) the port 210 included on the power adapter 202. Referring to FIG. 1, in some implementations, the first connector 212 can connect to (interface with) a port of the electronic device 104.

The power adapter 202 can receive an AC power signal from an AC power source via a second cable 206. The second cable 206 can include a plug 208 for electrically connecting to the AC power source (e.g., a household outlet receptacle). In some implementations, a plug (e.g., the plug 208) can be included (integrated with) the power adapter 202. In these implementations, the second cable 206 is not needed and the power adapter 202 using the plug 208 can electrically connect to the AC power source (e.g., a household outlet receptacle). In some implementations, the power adapter 202 can supply charge power to a power storage component (e.g., a battery) included in an electronic device. The power adapter 202 can supply the charge power to the power storage component by way of the first cable 204.

Figure 3A:
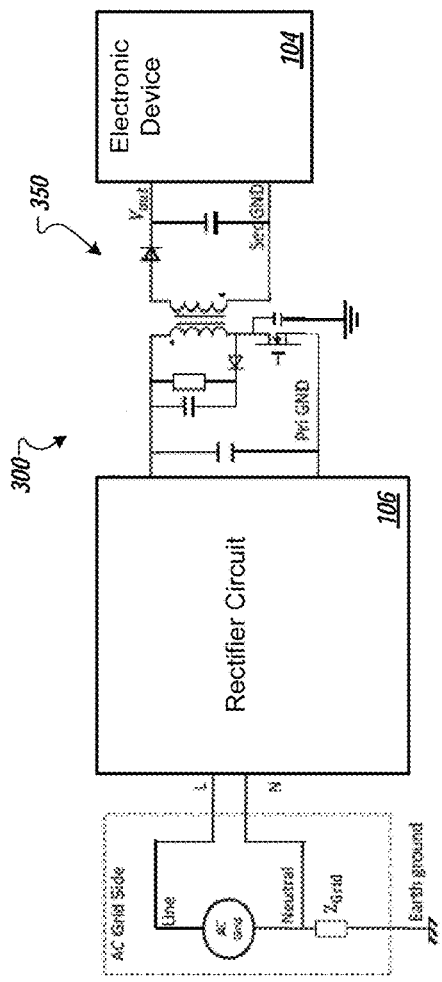
FIG. 3A shows a schematic circuit diagram of an example of the CM-noise reducing converter circuit of FIG. 1.
Figure 3B:
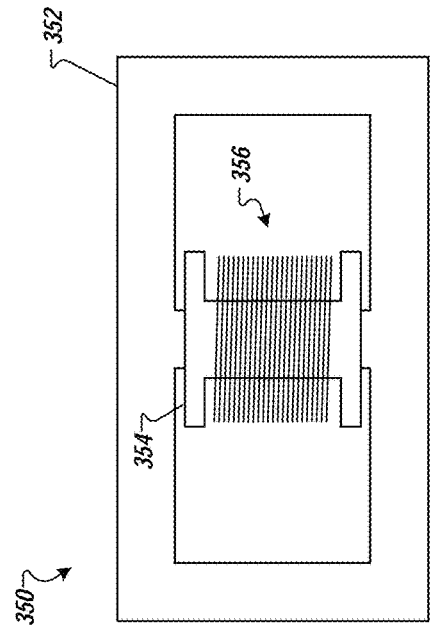
FIG. 3B shows a schematic drawing of windings of an example flyback converter assembly of the CM-noise reducing converter circuit of FIG. 1.

FIGS. 3A and 3B are schematic diagrams of an example CM-noise reducing converter circuit 300. FIG. 3A shows a schematic circuit diagram of an example of the CM-noise reducing converter circuit 300. The CM-noise reducing converter circuit 300 is an example of a CM-noise reducing converter circuit 108.

The CM-noise reducing converter circuit 300 includes a flyback converter assembly 350. The flyback converter assembly 350 increases or decreases the voltage differential between the rectified line and the neutral form the rectifier circuit 106. An example of the coils of the flyback converter assembly 350 is illustrated in and described with respect to FIG. 4A.

A voltage during an off phase or off state of the flyback converter assembly 350 can be transformed down to a value determined by the ratio of the turns of the transformer. Use of a flyback converter assembly 350 can provide multiple voltage outputs using a minimum number of components. For example, each additional output voltage can include an additional transformer winding, an additional diode, and an additional capacitor. A voltage during an on phase or on state of the flyback converter assembly 350 can be the value of an approximated direct current (DC) component of the voltage. The output voltage can also be altered by adjusting the duty cycle of the flyback converter. In this manner, the output voltage can be adjusted without modifying the number of turns, even when there is only a single output.

FIG. 3B shows a schematic drawing of windings of an example flyback converter assembly 350 of the CM-noise reducing converter circuit 300. The flyback converter assembly 350 includes a magnetic core 352, a bobbin 354, and a coil assembly 356.

The magnetic core 352 is a structure formed from a magnetic material such as ferrite that is used to modify a magnetic field generated by a current in the coil assembly 356. Although alternatives are possible, the magnetic core 352 has a rectangular loop shape in this example. Other shapes are possible for the magnetic core too, such as an oval shape, an "E" shape, a rod shape, or other shapes.

In this example, the coil assembly 356 is wound around a bobbin 354 that is disposed around a portion of the magnetic core 352 (e.g., around one side of the rectangular loop). The bobbin 354 is typically formed from an insulating material and has a cylindrical portion around which the conductors of the coil assembly 356 are wound.

The coil assembly 356 includes multiple winding assemblies. The coil assembly includes at least one winding assembly that is electrically connected to a primary portion of the CM-noise reducing converter circuit 300 and at least one winding assembly that is connected to a secondary portion of the CM-noise reducing converter circuit 300. The coil assembly 356 can also include one or more auxiliary winding assemblies. The winding assemblies can include layers of conductors wrapped around the bobbin 354. The layers of the winding assemblies can be interleaved. Based on the ratios between the number of times the conductors in the winding assemblies wrap around the magnetic core 352, a voltage applied to one of the winding assemblies will induce a stepped-up or stepped-down voltage in the other winding assemblies. In the coil assembly 356, layers of the winding assemblies are arranged to reduce CM-noise. An example arrangement of the winding assemblies of the coil assembly 356 is illustrated in and described with respect to FIG. 4B.

FIGS. 4A and 4B are schematic diagrams of an example of the flyback converter assembly 350 of the CM-noise reducing converter circuit 300. FIG. 4A shows a schematic circuit diagram of the coils of an example of the flyback converter assembly 350.

The flyback converter assembly 350 includes a primary portion 370 and a secondary portion 372. The primary portion 370 is in electrical connection with the AC power source (e.g., via the rectifier circuit 106). The secondary portion 372 is electrically isolated from the AC power source and is in electrical connection with a load device such as the electronic device 104. The primary portion 370 is grounded to a primary ground, while the secondary portion 372 is grounded to a secondary ground.

The primary portion 370 includes multiple coil winding assemblies, including a primary winding assembly 374 and an auxiliary winding assembly 376. The primary portion also includes a DC capacitor 378.

The primary winding assembly 374 includes a first primary terminal connector 380 and a second primary terminal connector 382. The first primary terminal connector 380 is connected to the line signal from the rectifier circuit 106. The second primary terminal connector 382 is connected to a drain of a transistor.

The auxiliary winding assembly 376 includes a first auxiliary terminal connector 384, a second auxiliary terminal connector 386, and a third auxiliary terminal connector 388. The auxiliary winding assembly 376 can be used to provide power to one or more components of the power adapter 102 (e.g., a control circuit, light, etc.). In various embodiments, the number of turns of the conductor or the auxiliary winding assembly 376 between the first auxiliary terminal connector 384 and the second auxiliary terminal connector 386 and between the second auxiliary terminal connector 386 and the third auxiliary terminal connector 388 varies (e.g., based on the power needs of the component to which the auxiliary winding assembly 376 is connected). The DC capacitor 378 is connected between the line signal from the rectifier circuit 106 and the primary ground.

The secondary winding assembly 390 includes a first secondary terminal connector 392 and a second secondary terminal connector 394. The first secondary terminal connector 392 provides the positive power signal for the load (e.g., the electronic device 104) and the second secondary terminal connector 394 is the neutral power signal (i.e., the secondary ground).

FIG. 4B shows a schematic diagram in cross-section of a portion of the example flyback converter assembly 350. In the figure, the outside of the coil is shown on the left and the inside of the coil is shown on the right.

As discussed above, the coil assembly 356 includes the primary winding assembly 374, the secondary winding assembly 390, and the auxiliary winding assembly 376. The windings of the coil assembly 356 are wound around the bobbin 354, which is disposed around the magnetic core 352.

Each of the winding assemblies includes at least one layer of windings. The windings variously start from either end of the bobbin (e.g., from top-to-bottom, or from bottom-to-top)

as described further below. The windings are formed from one or more strands of elongated conductive material (e.g., copper wire), which may be covered with an insulating shell (e.g., a wire insulator) or coated with an insulating layer.

In this example, the primary winding assembly 374 includes a first primary winding layer 410, a second primary winding layer 412, and a third primary winding layer 414. The secondary winding assembly 390 includes a first secondary winding layer 420 and a second secondary winding layer 422. The auxiliary winding assembly 376 comprises an auxiliary winding layer 430.

In the example of FIG. 4B, layers of the primary winding assembly 374, the secondary winding assembly 390, and the auxiliary winding assembly 376 are interleaved. For example, the layers can be interleaved to reduce or minimize leakage inductance. In some embodiments, the layers of the winding assemblies are separated by an insulator such as insulating tape or paper.

For example, the layers are arranged in the following order (starting from the outside of the coil) in FIG. 4B: the first secondary winding layer 420, the first primary winding layer 410, the second secondary winding layer 422, the auxiliary winding layer 430, the second primary winding layer 412, and the third primary winding layer 414.

This arrangement of layers of the winding assemblies reduces CM-noise as compared to many other winding arrangements by, for example, arranging the layers so that the voltage differences between layers of the primary winding assembly and adjacent layers of the secondary winding assembly are reduced or minimized.

In some embodiments, the terminal connectors of the primary winding assembly 374, the secondary winding assembly 390, and the auxiliary winding assembly 376 are arranged to reduce CM-noise. For example, the placement of the terminal connectors can further reduce the voltage differences between layers of the primary winding assembly 374 and adjacent layers of the secondary winding assembly 390.

In at least some embodiments, the layers of the primary winding assembly 374 are connected in series. The first primary winding layer 410 includes windings starting at a first end (shown as the top in FIG. 4B) of the coil assembly 356 and continuing to a second end (shown as the top in FIG. 4B) of the coil assembly 356, the second primary winding layer 412 includes windings starting at the second end of the coil assembly 356 and continuing to the first end of the coil assembly 356, the third primary winding layer 414 includes windings starting at the first end of the coil assembly 356 and continuing to the second end of the coil assembly 356. The first primary terminal connector 380 is attached to the first primary winding layer 410 at a start of the windings and the second primary terminal connector 382 is attached to the third primary winding layer 414 at an end of the windings.

In at least some embodiments the layers of the secondary winding assembly 390 are connected in parallel. The first secondary winding layer 420 includes windings starting at the first end of the coil assembly 356 and continuing to the second end of the coil assembly 356, the second secondary winding layer 422 includes windings starting at the first end of the coil assembly 356 and continuing to the second end of the coil assembly 356. The first secondary terminal connector 392 is attached to the first secondary winding layer 420 at a start of the windings and the second secondary winding layer 422 at a start of the windings, and the second secondary terminal connector 394 is attached to both the first secondary winding layer 420 at an end of the windings and the second secondary winding layer 422 at an end of the windings.

Additionally, the auxiliary winding layer 430 comprises windings starting at the first end of the coil assembly 356 and continuing to a second end of the coil assembly 356. The first auxiliary terminal connector 384 is attached to the auxiliary winding layer 430 at a start of the windings, the second auxiliary terminal connector 386 is attached to the auxiliary winding layer 430 between the start of the windings and an end of the windings, and the third auxiliary terminal connector 388 is attached to the auxiliary winding layer 430 at the end of the windings. The second auxiliary terminal connector 386 can be connected to the auxiliary winding layer 430 at a position between the top and the bottom of the auxiliary winding layer 430 (e.g., at the middle of the auxiliary winding layer 430, within the middle 10% of the auxiliary winding layer 430, within the middle 20% of the auxiliary winding layer 430, within the middle 50% of the auxiliary winding layer 430). Beneficially, this arrangement of terminal connections further reduces the voltage differences between adjacent layers of the primary and secondary winding assemblies so as to reduce CM-noise.

FIGS. 5A and 5B are schematic diagrams of another example of a flyback converter assembly 450. The flyback converter assembly 450 is an example of the flyback converter assembly 350 and can be used in embodiments of the CM-noise reducing converter circuit 300. The flyback converter assembly 450 is similar to the flyback converter assembly 350 except that the flyback converter assembly 450 includes an additional auxiliary winding assembly 452.

FIG. 5A shows a schematic circuit diagram of the coils of the flyback converter assembly 450. The flyback converter assembly 450 includes the primary winding assembly 374, the secondary winding assembly 390, the auxiliary winding assembly 376, and the additional auxiliary winding assembly 452.

The additional auxiliary winding assembly 452 includes an additional auxiliary terminal connector 454. In some embodiments, the additional auxiliary terminal connector 454 is connected to ground on the primary portion 370 of the flyback converter assembly 450 and the other end of the additional auxiliary additional winding assembly is open (i.e., not connected to anything).

FIG. 5B shows a schematic diagram in cross-section of a portion of the example flyback converter assembly 450, including a coil assembly 460. In the figure, the outside of the coil is shown on the left and the inside of the coil is shown on the right.

The additional auxiliary winding assembly 452 includes an additional auxiliary layer 462. In this example, the additional auxiliary layer 462 is disposed on the outside of the first secondary winding layer 420. In whole, the layers of the coil assembly 460 are arranged in the following order (starting from the outside of the coil) in FIG. 5B: the additional auxiliary layer 462, the first secondary winding layer 420, the first primary winding layer 410, the second secondary winding layer 422, the auxiliary winding layer 430, the second primary winding layer 412, and the third primary winding layer 414.

The voltage difference between the additional auxiliary layer 462 and the first secondary winding layer 420 generates a displacement CM current flowing from first secondary winding layer 420 to additional auxiliary layer 462 and then back to primary portion 370. This displacement CM current can at least partially cancel the displacement CM current flowing from the first primary winding layer 410 to the first secondary winding layer 420 and to the second secondary winding layer 422 due to the positive voltage differences between the first primary winding layer 410 and the first secondary winding layer 420 and between the first primary winding layer 410 and the second secondary winding layer 422 (e.g., when the first primary winding layer 410 has more number of turns than the first secondary winding layer 420 and the second secondary winding layer 422). The CM current generated by this voltage difference between the additional auxiliary layer 462 and the first secondary winding layer 420 can also at least partially cancel out a CM current between the auxiliary winding layer 430 and the second secondary winding layer 422 due to the positive voltage difference between the auxiliary winding layer 430 and the second secondary winding layer 422 (e.g., when the auxiliary winding layer 430 has more number of turns than the second secondary winding layer 422).

Because the additional auxiliary layer 462 is disposed on the outside of the coil assembly 460, it is easier to adjust the number of windings as compared to the other layers of the coil assembly 460. Because the additional auxiliary winding is on the outside of the coil assembly 460, the additional auxiliary winding does not generate eddy current loss. Additionally, because the additional auxiliary winding is on the outside of the coil assembly 460, the additional auxiliary winding reduces the leakage inductance compared to conventional shielding techniques. In some embodiments, the position of the additional auxiliary layer 462 can be adjusted with respect to the first side and second side of the coil assembly 460 to make cancellation more efficient. For example, the winding of the additional auxiliary layer 462 can start at the first end of the coil assembly 460 and go towards the second end of the coil assembly 460. In this arrangement, the voltage difference between the additional auxiliary layer 462 and the first secondary winding layer 420 is greater than when the additional auxiliary layer 462 winding starts from the second end allowing fewer number of turns to have a greater cancellation effect. Because of above reasons, this technique is more efficient than using a shielding layer. And this technique can reduce the cost and size of a transformer.

Figure 6:
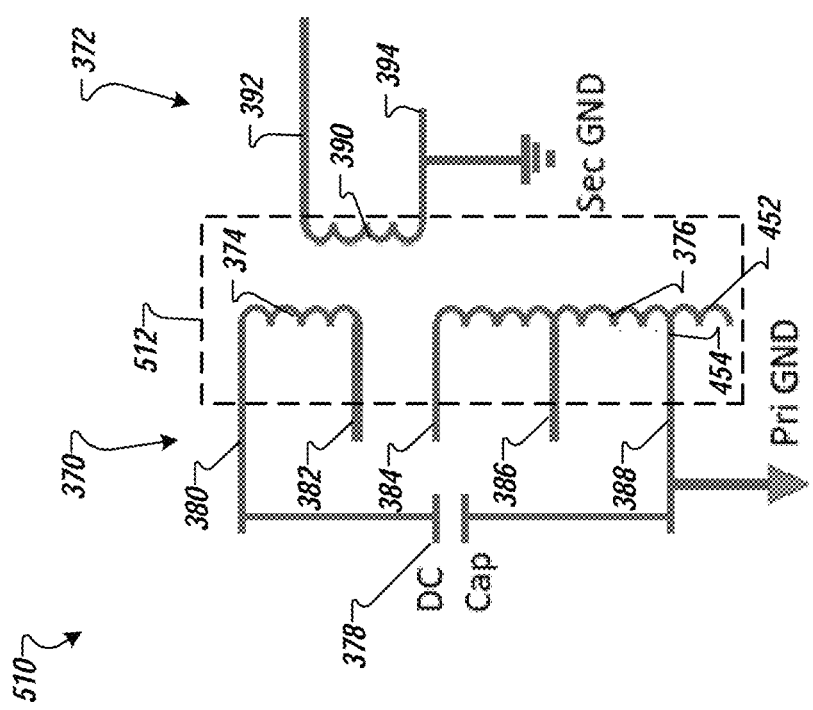
FIG. 6 is a schematic circuit diagram of another embodiment of a flyback converter circuit assembly of FIG. 3A.

FIG. 6 is a schematic circuit diagram of another embodiment of a flyback converter circuit assembly 510. The flyback converter assembly 510 is an example of the flyback converter assembly 350 and can be used in embodiments of the CM-noise reducing converter circuit 300. The flyback converter assembly 510 is similar to the flyback converter assembly 450 except that the flyback converter assembly 510 includes a shielding structure 512. The shielding structure 512 is formed from an electrically conductive material. For example, in some embodiments, the shielding structure 512 comprises copper foil. In some embodiments, the shielding structure 512 is in electrical contact with the primary ground. In at least some implementations, the shielding structure 512 is outside the transformer core and eliminates or minimizes CM noise from paths to heatsinks on a circuit board to which the flyback convert assembly 350 is attached. For example, the circuit board can include a primary heatsink and a secondary heatsink, and the shielding structure 512 may eliminate or minimize CM noise from the primary heatsink the transformer core or winding assembly to the secondary heatsink.

Figure 7:
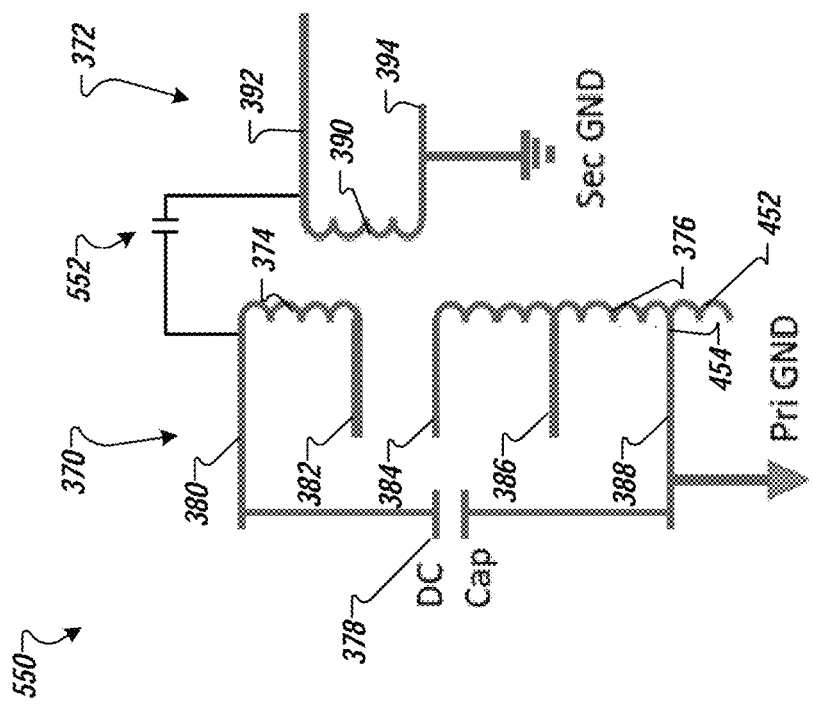
FIG. 7 shows a schematic circuit diagram of an example flyback converter assembly of FIG. 3A.

FIG. 7 shows a schematic circuit diagram of an example flyback converter assembly 550. The flyback converter assembly 550 is an example of the flyback converter assembly 350 and can be used in embodiments of the CM-noise reducing converter circuit 300. The flyback converter assembly 550 is similar to the flyback converter assembly 450 except that the flyback converter assembly 550 includes a balance capacitor 552.

The balance capacitor 552 balances the capacitance between the primary portion 370 and the secondary portion 372. The capacitance of the balance capacitor 552 can be selected to cancel out the total capacitance (e.g., as determined empirically or using modeling techniques) between the primary portion 370 and the secondary portion 372.

Although alternatives are possible, in FIG. 7, the balance capacitor 552 is shown as being connected between the first primary terminal connector 380 and the first secondary terminal connector 392. Alternatively, the balance capacitor can be connected between the second primary terminal connector 382 and the second secondary terminal connector 394. In some embodiments, the capacitance of the balance capacitor is equal to the product of the turn ratio between the primary winding assembly 374 and the secondary winding assembly 390 multiplied by the capacitance between the second primary terminal connector 382 and the second secondary terminal connector 394.

Figure 8:
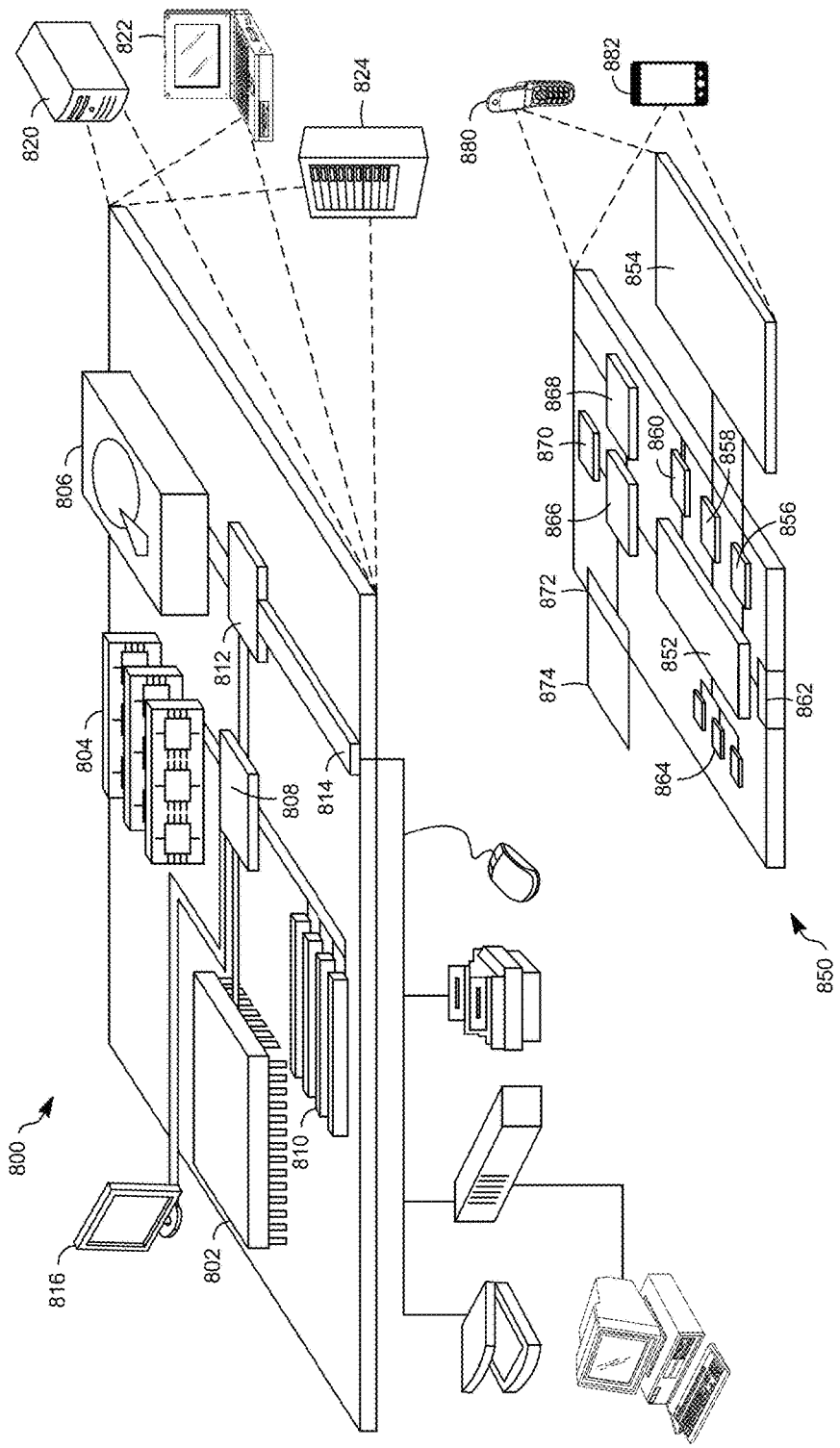
FIG. 8 shows an example of a computer device and a mobile computer device that can be used to implement the techniques described here.

FIG. 8 shows an example of a generic computer device 800 and a generic mobile computer device 850, which may be used with the techniques described here. The computer device 800 and the mobile computer device 850 are examples of the electronic device 104. Computing device 800 is intended to represent various forms of digital computers, such as laptops, desktops, tablets, workstations, personal digital assistants, televisions, servers, blade servers, mainframes, and other appropriate computing devices. Computing device 850 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. The processor 802 can be a semiconductor-based processor. The memory 804 can be a semiconductor-based memory. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, or memory on processor 802.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD (Thin-Film-Transistor Liquid Crystal Display) or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provided in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provided as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852, that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880.

It may also be implemented as part of a smart phone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the specification.

In addition, any logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A converter circuit comprising:
   a magnetic core; and
   a coil assembly, the coil assembly including:
      a primary winding assembly comprising a conductive medium arranged in at least a first primary winding layer, a second primary winding layer, and a third primary winding layer;
      a secondary winding assembly comprising a conductive medium arranged in at least a first secondary winding layer and a second secondary winding layer; and
      an auxiliary winding assembly comprising a conductive medium arranged in at least one auxiliary winding layer, the at least one auxiliary winding layer comprising an auxiliary winding layer disposed adjacent to a layer of the at least one primary winding layer and adjacent to a layer of the at least one secondary winding layer, wherein:
      the first secondary winding layer is adjacent to the first primary winding layer;
      the first primary winding layer is adjacent to the second secondary winding layer;
      the second secondary winding layer is adjacent to the auxiliary winding layer;
      the auxiliary winding layer is adjacent to the second primary winding layer; and
      the second primary winding layer is adjacent to the third primary winding layer.

2. The converter circuit of claim 1 further comprising a first insulating layer disposed between the auxiliary winding layer and the adjacent primary winding layer, and a second insulating layer disposed between the auxiliary winding layer and the adjacent secondary winding layer.

3. The converter circuit of claim 2, wherein the first insulating layer comprises insulating tape and the second insulating layer comprises insulating tape.

4. The converter circuit of claim 1, wherein:
   the first primary winding layer comprises windings starting at a first end of the coil assembly and continuing to a second end of the coil assembly, the second primary winding layer comprises windings starting at the second end of the coil assembly and continuing to the first end of the coil assembly, the third primary winding layer comprises windings starting at the first end of the coil assembly and continuing to the second end of the coil assembly;
   the primary winding assembly further comprises a first primary terminal connector and a second primary terminal connector;
   the first primary terminal connector is attached to the first primary winding layer at a start of the windings and the second primary terminal connector is attached to the third primary winding layer at an end of the windings;
   the first secondary winding layer comprises windings starting at the first end of the coil assembly and continuing to the second end of the coil assembly, the second secondary winding layer comprises windings starting at the first end of the coil assembly and continuing to the second end of the coil assembly;

the secondary winding assembly further comprises a first secondary terminal connector and a second secondary terminal connector; and the first secondary terminal connector is attached to the first secondary winding layer at a start of the windings and the second secondary winding layer at a start of the windings, and the second secondary terminal connector is attached to both the first secondary winding layer at an end of the windings and the second secondary winding layer at an end of the windings.

5. The converter circuit of claim 4, wherein:

the auxiliary winding layer comprises windings starting at the first end of the coil assembly and continuing to the second end of the coil assembly;

the auxiliary winding assembly further comprises a first auxiliary terminal connector, a second auxiliary terminal connector, and a third auxiliary terminal connector; and the first auxiliary terminal connector is attached to the auxiliary winding layer at a start of the windings, the second auxiliary terminal connector is attached to the auxiliary winding layer between the start of the windings and an end of the windings, and the third auxiliary terminal connector is attached to the auxiliary winding layer at the end of the windings.

6. The converter circuit of claim 1, further comprising a balance capacitor disposed between the primary winding assembly and the secondary winding assembly.

7. The converter circuit of claim 6, wherein the balance capacitor is connected to a primary ground on a first side of the balance capacitor and a secondary ground on a second side of the balance capacitor.

8. The converter circuit of claim 1, further comprising an additional auxiliary winding assembly comprising a conductive medium arranged in at least one additional auxiliary winding layer, the at least one additional auxiliary winding layer being disposed adjacent to a layer of the primary winding assembly and adjacent to the first secondary winding layer.

9. The converter circuit of claim 1, further comprising a shielding structure disposed around the magnetic core.

10. The converter circuit of claim 9, wherein the shielding structure comprises copper foil.

11. A power adapter comprising:

a rectifier circuit; and a converter circuit comprising:

a magnetic core; and a coil assembly, the coil assembly including:

a primary winding assembly comprising a conductive medium arranged in a plurality of primary winding layers, the plurality of primary winding layers comprising a first primary winding layer, a second primary winding layer, and a third primary winding layer;

a secondary winding assembly comprising a conductive medium arranged in a plurality of secondary winding layers, the plurality of secondary winding layers comprising a first secondary winding layer and a second secondary winding layer; and an auxiliary winding assembly comprising a conductive medium arranged in at least one auxiliary winding layer, the at least one auxiliary winding layer comprising an auxiliary winding layer, the auxiliary winding layer being disposed adjacent to a layer of the plurality of primary winding layers and adjacent to a layer of the plurality of secondary winding layers.

12. The power adapter of claim 11 further comprising a first insulating layer disposed between the auxiliary winding layer and the adjacent primary winding layer, and a second insulating layer disposed between the auxiliary winding layer and the adjacent secondary winding layer.

13. The power adapter of claim 12, wherein the first insulating layer comprises insulating tape and the second insulating layer comprises insulating tape.

14. The power adapter of claim 11, wherein:

the first secondary winding layer is adjacent to the first primary winding layer;

the first primary winding layer is adjacent to the second secondary winding layer;

the second secondary winding layer is adjacent to the auxiliary winding layer;

the auxiliary winding layer is adjacent to the second primary winding layer; and the second primary winding layer is adjacent to the third primary winding layer.

15. The power adapter of claim 14, wherein:

the first primary winding layer comprises windings starting at a first end of the coil assembly and continuing to a second end of the coil assembly, the second primary winding layer comprises windings starting at the second end of the coil assembly and continuing to the first end of the coil assembly, the third primary winding layer comprises windings starting at the first end of the coil assembly and continuing to the second end of the coil assembly;

the primary winding assembly further comprises a first primary terminal connector and a second primary terminal connector;

the first primary terminal connector is attached to the first primary winding layer at a start of the windings and the second primary terminal connector is attached to the third primary winding layer at an end of the windings;

the first secondary winding layer comprises windings starting at the first end of the coil assembly and continuing to the second end of the coil assembly, the second secondary winding layer comprises windings starting at the first end of the coil assembly and continuing to the second end of the coil assembly;

the secondary winding assembly further comprises a first secondary terminal connector and a second secondary terminal connector;

the first secondary terminal connector is attached to the first secondary winding layer at a start of the windings and the second secondary winding layer at a start of the windings, and the second secondary terminal connector is attached to both the first secondary winding layer at an end of the windings and the second secondary winding layer at an end of the windings;

the auxiliary winding layer comprises windings starting at the first end of the coil assembly and continuing to the second end of the coil assembly;

the auxiliary winding assembly further comprises a first auxiliary terminal connector, a second auxiliary terminal connector, and a third auxiliary terminal connector; and the first auxiliary terminal connector is attached to the auxiliary winding layer at a start of the windings, the second auxiliary terminal connector is attached to the auxiliary winding layer between the start of the windings and an end of the windings, and the third auxiliary terminal connector is attached to the auxiliary winding layer at the end of the windings.

16. The power adapter of claim 11, further comprising an additional auxiliary winding assembly comprising a conductive medium arranged in at least one additional auxiliary winding layer, the at least one additional auxiliary winding layer being disposed adjacent to a layer of the plurality of primary winding layers and adjacent to the first secondary winding layer.

17. A system comprising:
a computing device comprising:
  a processing device;
  a memory device; and
  a display device; and
a power adapter comprising:
  a rectifier circuit; and
  a converter circuit comprising:
    a magnetic core; and
    a coil assembly, the coil assembly including:
      a primary winding assembly comprising a conductive medium arranged in a plurality of primary winding layers, the plurality of primary winding layers comprising a first primary winding layer, a second primary winding layer, and a third primary winding layer;
      a secondary winding assembly comprising a conductive medium arranged in a plurality of secondary winding layers, the plurality of secondary winding layers comprising a first secondary winding layer and a second secondary winding layer;
      an auxiliary winding assembly comprising a conductive medium arranged in at least one auxiliary winding layer, the at least one auxiliary winding layer comprising an auxiliary winding layer, the auxiliary winding layer being disposed adjacent to a layer of the plurality of primary winding layers and adjacent to a layer of the plurality of secondary winding layers; and
      an additional auxiliary winding assembly comprising a conductive medium arranged in at least one additional auxiliary winding layer, the at least one additional auxiliary winding layer being disposed at the outside of the coil assembly.

18. The system of claim 17, wherein:
the first secondary winding layer is adjacent to the first primary winding layer;
the first primary winding layer is adjacent to the second secondary winding layer;
the second secondary winding layer is adjacent to the auxiliary winding layer;
the auxiliary winding layer is adjacent to the second primary winding layer; and
the second primary winding layer is adjacent to the third primary winding layer.

* * * * *